US008656587B2

(12) United States Patent
Karnes et al.

(10) Patent No.: US 8,656,587 B2
(45) Date of Patent: Feb. 25, 2014

(54) METHOD AND APPARATUS FOR MAKING CORED WIRE

(75) Inventors: Donovan Karnes, Troy, OH (US); Philip V. Monnin, Troy, OH (US)

(73) Assignee: RevWires LLC, Troy, OH (US)

( * ) Notice: Subject to any disclaimer, the term of this patent is extended or adjusted under 35 U.S.C. 154(b) by 1165 days.

(21) Appl. No.: 12/307,013

(22) PCT Filed: Jul. 6, 2007

(86) PCT No.: PCT/US2007/072936
§ 371 (c)(1),
(2), (4) Date: Feb. 24, 2009

(87) PCT Pub. No.: WO2008/006057
PCT Pub. Date: Jan. 10, 2008

(65) Prior Publication Data
US 2009/0241336 A1    Oct. 1, 2009

Related U.S. Application Data

(60) Provisional application No. 60/819,411, filed on Jul. 7, 2006.

(51) Int. Cl.
*H01R 43/00*       (2006.01)
*H01R 43/16*       (2006.01)

(52) U.S. Cl.
USPC .............................................. 29/868; 29/875

(58) Field of Classification Search
USPC ........... 29/868, 875, 825, 828, 33 F; 228/148, 228/156; 505/230
See application file for complete search history.

(56) References Cited

U.S. PATENT DOCUMENTS

| 1,127,281 | A | * | 2/1915 | Read | 338/238 |
| 4,048,705 | A | * | 9/1977 | Blanpain et al. | 419/61 |
| 4,269,639 | A | * | 5/1981 | Lewis | 156/54 |

(Continued)

FOREIGN PATENT DOCUMENTS

| GB | 2 106 428 A | 9/1982 |
| JP | H02-31638 | 7/1985 |

(Continued)

OTHER PUBLICATIONS

Office Action dated Jul. 19, 2012 for Canadian Patent Application No. 2,657,129 (3 pgs).

(Continued)

*Primary Examiner* — David Angwin
(74) *Attorney, Agent, or Firm* — Brinks Gilson & Lione

(57) ABSTRACT

A method for making continuously a cored wire includes feeding a flat metal strip at a first speed during a run, and measuring automatically dimensions of the strip continuously during the run. The strip is formed into a channel open upwardly and sized to hold a quantity of at least one fill material, which is transported continuously during the run and delivered through a metering device at a delivery speed. The delivery speed is automatically adjusted during the run to ensure that the quantity of the at least one fill material deposited into the channel is in a desired core ratio range about the desired core ratio. The delivery speed adjustment is based on the first speed, the measured dimensions of the strip, and the volume of the at least one fill material determined to be in transport by the metering device.

24 Claims, 14 Drawing Sheets

(56) References Cited

U.S. PATENT DOCUMENTS

| | | | | |
|---|---|---|---|---|
| 4,305,197 | A | * | 12/1981 | Puschner et al. ............... 419/8 |
| 4,313,247 | A | * | 2/1982 | Stuttard ..................... 29/33 F |
| 4,423,119 | A | * | 12/1983 | Brown et al. ................. 428/558 |
| 4,512,827 | A | * | 4/1985 | Gill ............................ 156/48 |
| 4,587,726 | A | * | 5/1986 | Holmgren ..................... 29/825 |
| 4,758,404 | A | * | 7/1988 | Muto ........................... 419/3 |
| 5,252,550 | A | * | 10/1993 | Yamauchi et al. ............. 505/433 |
| 5,260,540 | A | * | 11/1993 | Kamimura et al. ......... 219/76.14 |
| 5,261,527 | A | * | 11/1993 | Krismanth et al. ............ 198/833 |
| 5,492,216 | A | * | 2/1996 | McCoy et al. ............. 198/626.5 |
| 5,701,648 | A | * | 12/1997 | Ni .............................. 29/33 R |
| 5,778,287 | A | * | 7/1998 | Yu .............................. 399/167 |
| 5,824,992 | A | * | 10/1998 | Nagarajan et al. ....... 219/145.22 |
| 5,855,477 | A | * | 1/1999 | Tanino ......................... 432/243 |
| 5,958,330 | A | * | 9/1999 | Westman ..................... 266/252 |
| 6,170,583 | B1 | * | 1/2001 | Boyce ......................... 175/426 |
| 6,264,538 | B1 | * | 7/2001 | Rettig ......................... 451/184 |
| 6,540,126 | B2 | * | 4/2003 | Nakamura ..................... 228/13 |
| 6,685,082 | B2 | * | 2/2004 | Frohne et al. .............. 228/173.7 |
| 6,915,564 | B2 | * | 7/2005 | Adams ........................ 29/828 |
| 6,957,735 | B2 | * | 10/2005 | Varone et al. ............... 198/813 |
| 7,018,954 | B2 | * | 3/2006 | Thieme et al. ............... 505/430 |
| 7,037,227 | B2 | * | 5/2006 | Varone et al. ............... 474/101 |
| 7,807,948 | B2 | * | 10/2010 | Katiyar ................... 219/145.22 |
| 8,188,408 | B2 | * | 5/2012 | Claesson et al. ............. 219/388 |
| 2002/0198111 | A1 | * | 12/2002 | Tomsic ........................ 505/230 |

FOREIGN PATENT DOCUMENTS

| | | |
|---|---|---|
| JP | S63-165100 | 7/1988 |
| JP | S63-235094 | 9/1988 |
| JP | H04-81297 | 3/1992 |
| JP | H05-293687 | 11/1993 |
| JP | H06-7994 | 1/1994 |
| JP | H07-303992 | 11/1995 |
| JP | H08-132283 | 5/1996 |

OTHER PUBLICATIONS

Extended European Search Report dated Sep. 7, 2012 for European Patent Application No. 07812679.4 (4 pgs).

International Search Report, Application No. PCT/US07/072936, 3 pages, Aug. 8, 2008.

Office Action for Japanese Patent Application 2009-519607 mailed Mar. 7, 2013, 6 pgs (English Translation).

First European Examination Report for European Patent Application No. 07812679.4 issued Jun. 5, 2013, 5 pgs.

* cited by examiner

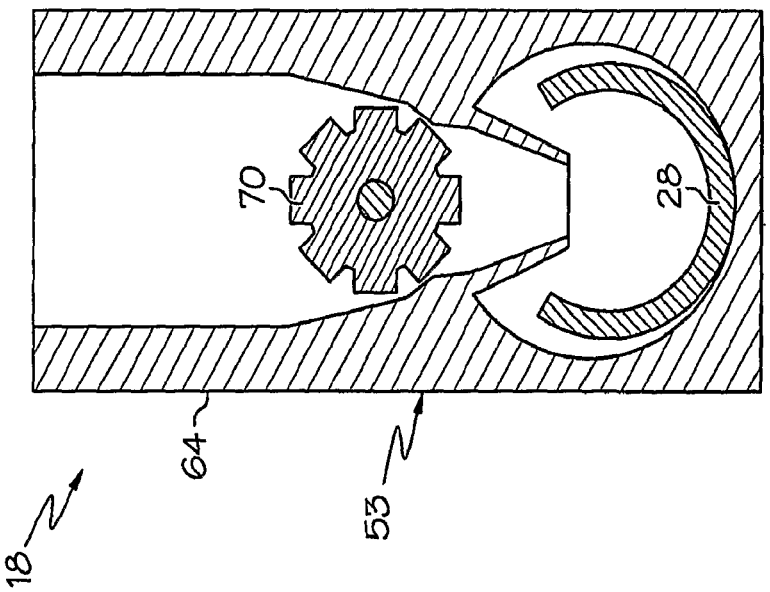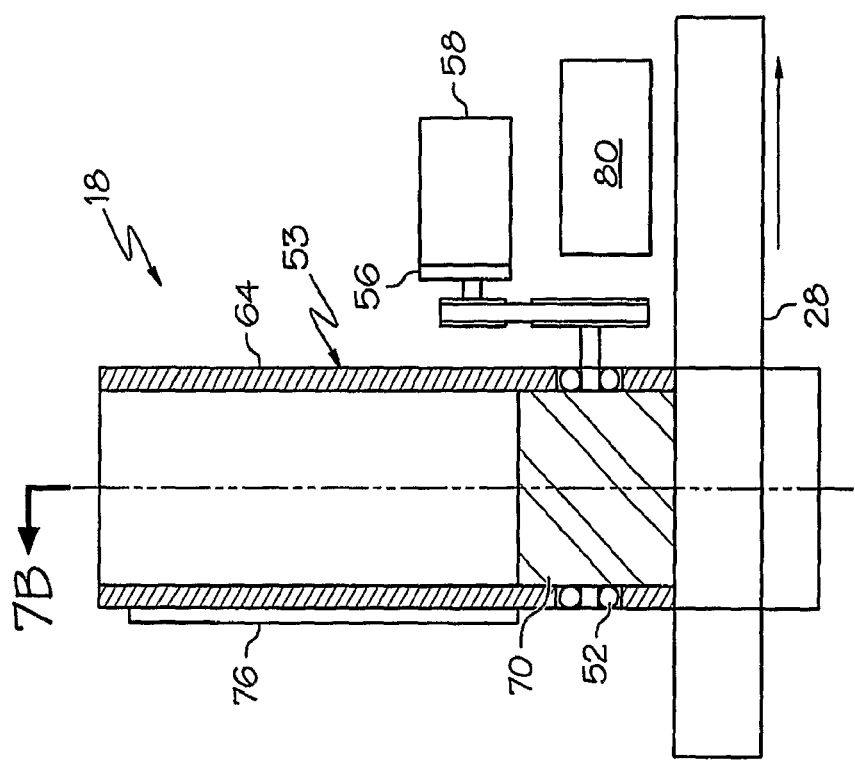

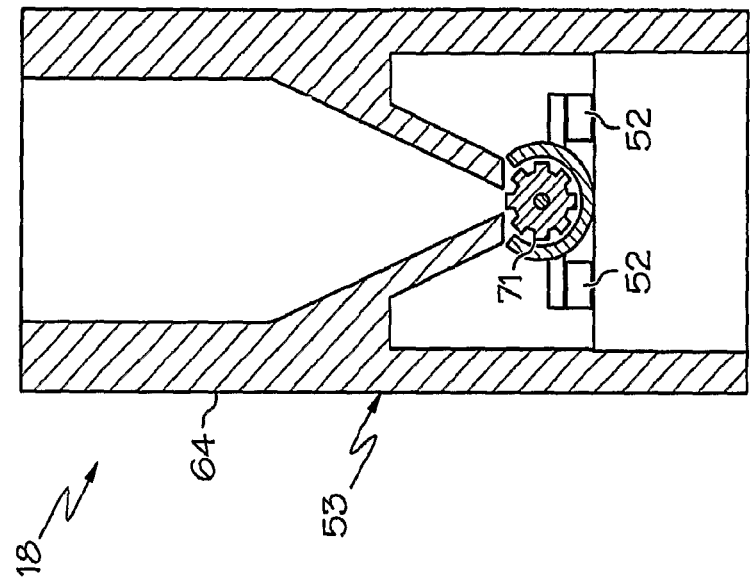
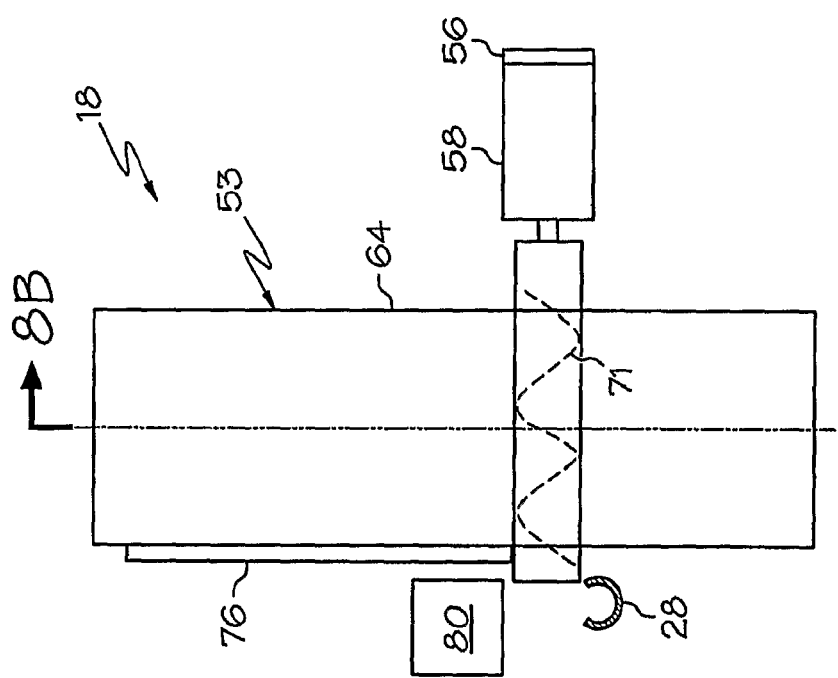

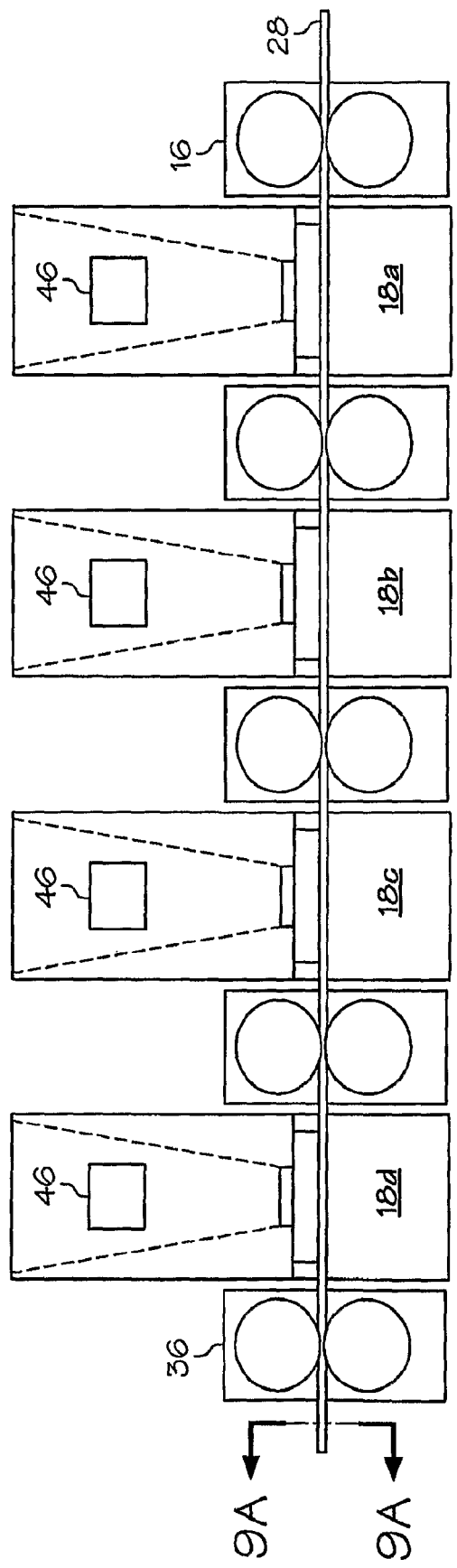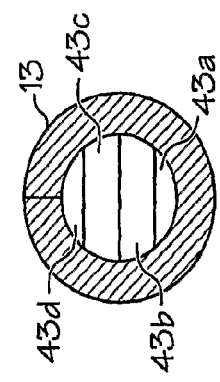

METHOD AND APPARATUS FOR MAKING CORED WIRE

The present invention relates to tube manufacturing, and in particular to an improved method and apparatus for making cored wire filled with a powdery and/or granular fill material.

Prior art apparatus and methods manufacture tubing and powder filled tubing with little or no control over the production process. As an example, a cored wire, which is used as an electrode in welding, is a continuous, tubular electrode wire, with a sheath of low carbon, mild steel, and a fill material of powders, which may contain deoxidizers, slag formers, arc stabilizers, and alloying materials. The basic processes used to produce cored wire have not changed that much over time. For example, the flux cored wire is made by using a first set of forming dies to shape a continuously feed metal strip into a U-shape. The bottom of the U-shaped metal strip is then filled with the fill material. Next, another set of forming dies shape the filled U-shaped metal strip into an O-shape tube, whereby the meeting edges of the metal strip are forced together to seal the opening. Additional forming dies then reduce the diameter of the O-shaped tube into a wire of a desired diameter.

Although both strip and fill materials are poorly monitored, if at all, by manufactures to conform with detailed specifications, few if any cored wire manufactures are able to achieve better than a ±2% variation from a desired core ratio. The core ratio is measured as a percentage of fill material weight divided by the total weight of the wire including the core of fill material. Currently, there is a need for higher quality cored wire that achieves better than a ±1% variation from the desired core ratio. An out-of-tolerance core ratio (e.g., in some applications, greater than ±1.5% variation from a desired core ratio) is often the major contributor to reworking of welds made with flux cored wire.

It is against the above background that the present invention provides equipment used to make tubing and powder filled tubing which controls automatically the depositing of the fill material used in cored wire manufacturing by accounting for a variety of process changes, such as, for example, variations in strip feed, strip width, strip thickness, fill material flow, and in some embodiments, also fill material density. Such automatic monitoring and control uses detected strip measurements and detected material volumes to produce a high quality tubular welding wire (e.g., about ±0.5% variation from the desired core ratio). The present invention has application in the manufacturing of cored wire, superconductors, cladding wire, and any cored tube filled with a powdery and/or granular fill material to an improved specification and material variation tolerance.

These and other features and advantages of the invention will be more fully understood from the following description of various embodiments of the invention taken together with the accompanying drawings.

The following detailed description of the embodiments of the present invention can be best understood when read in conjunction with the following drawings, where like structure is indicated with like reference numerals, and in which.

Figure 6B:
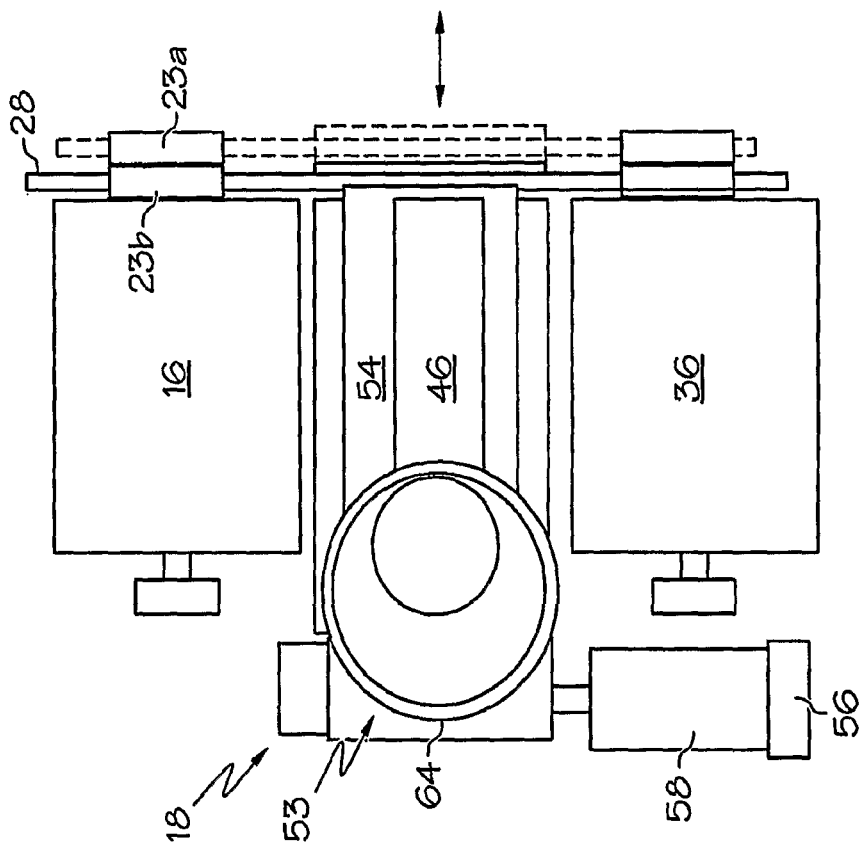
Figure 6A:
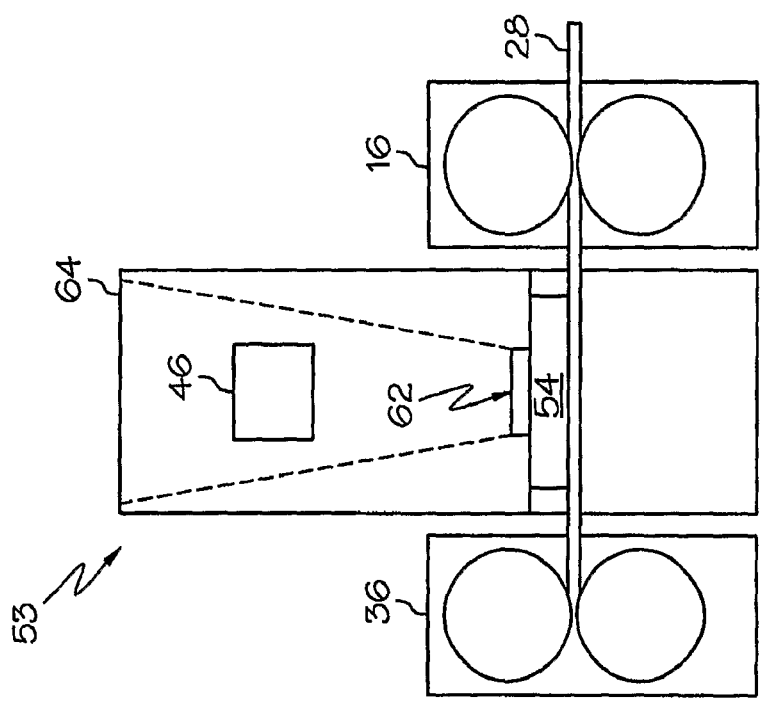
Figure 6C:
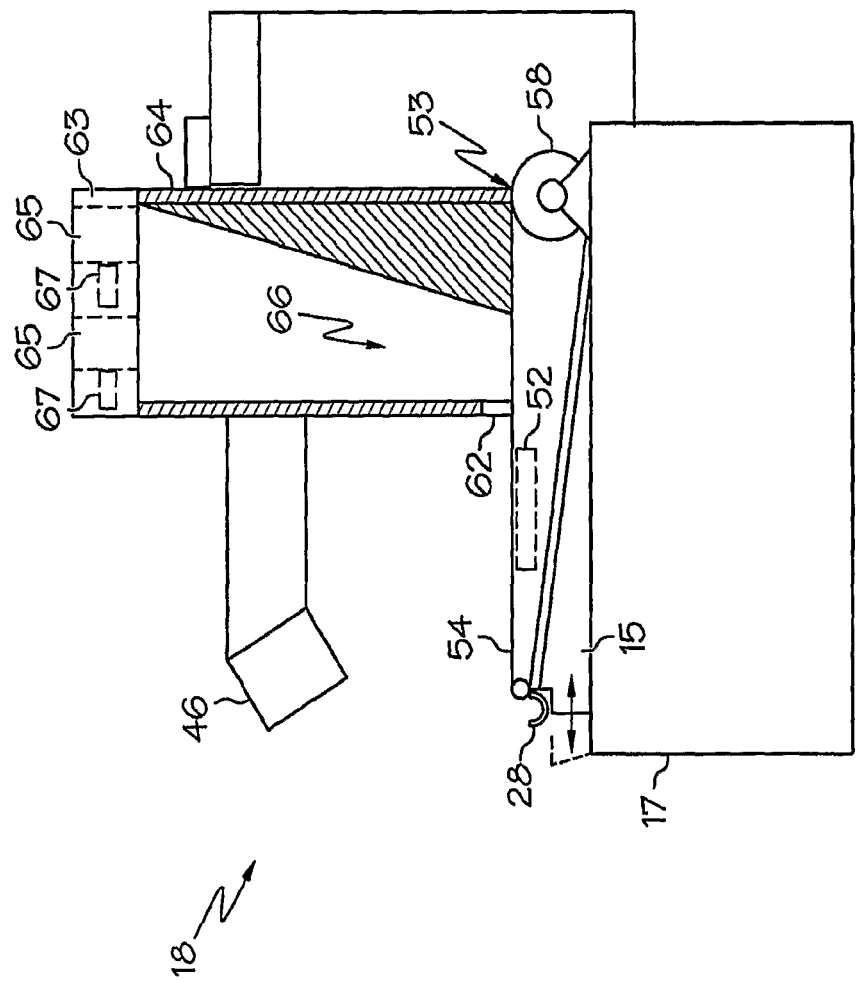
Figure 10:
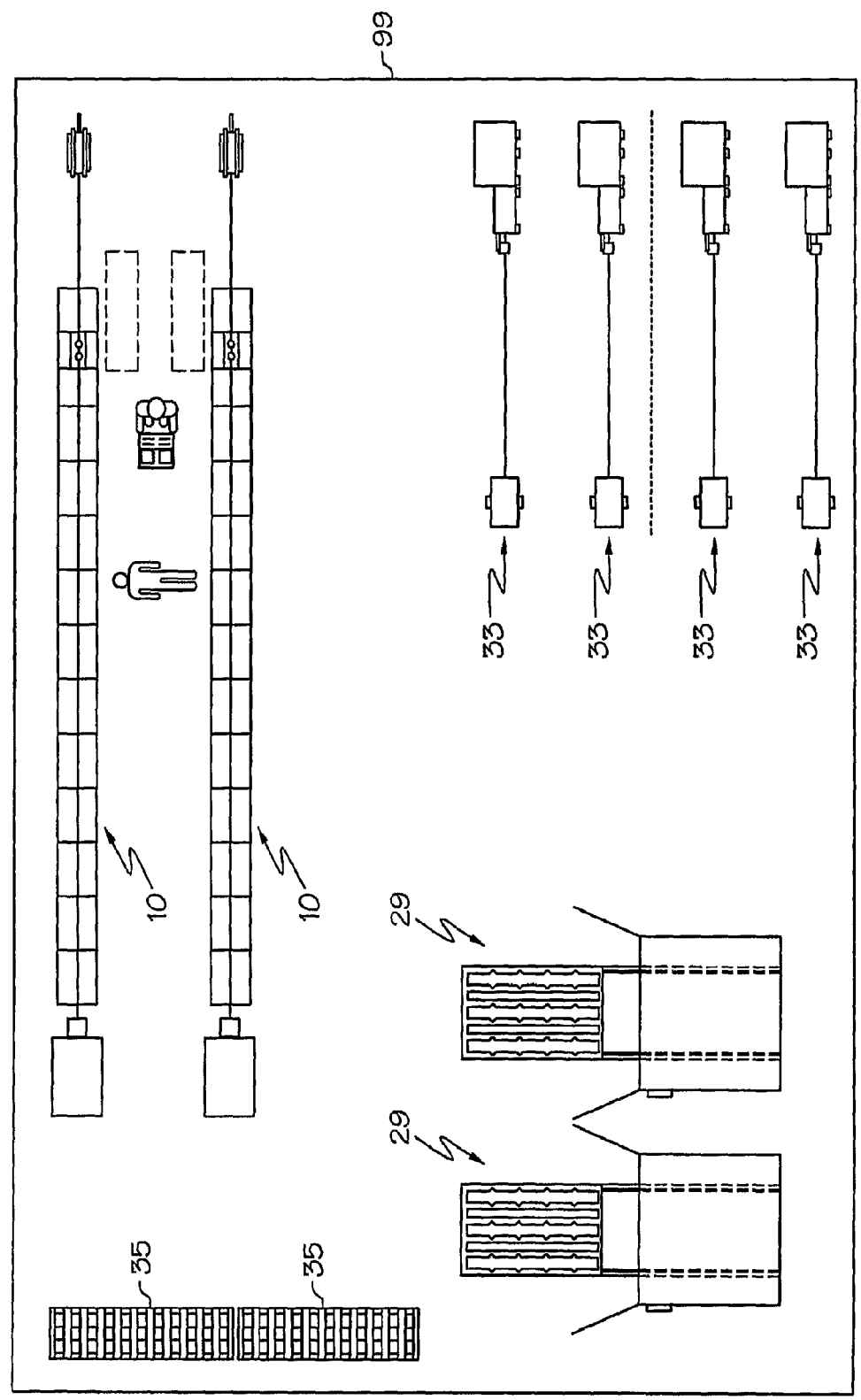
Figure 11:
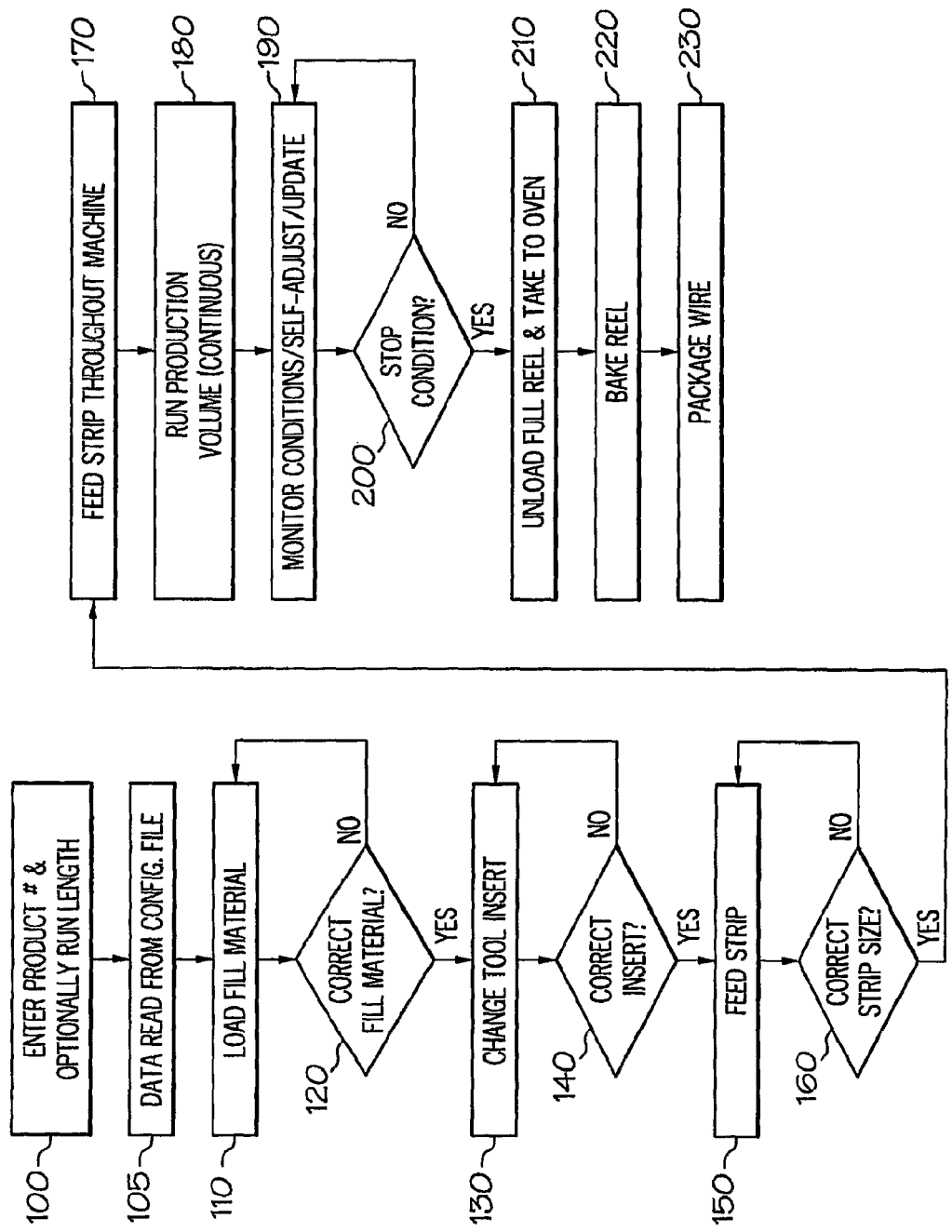
Figure 12:
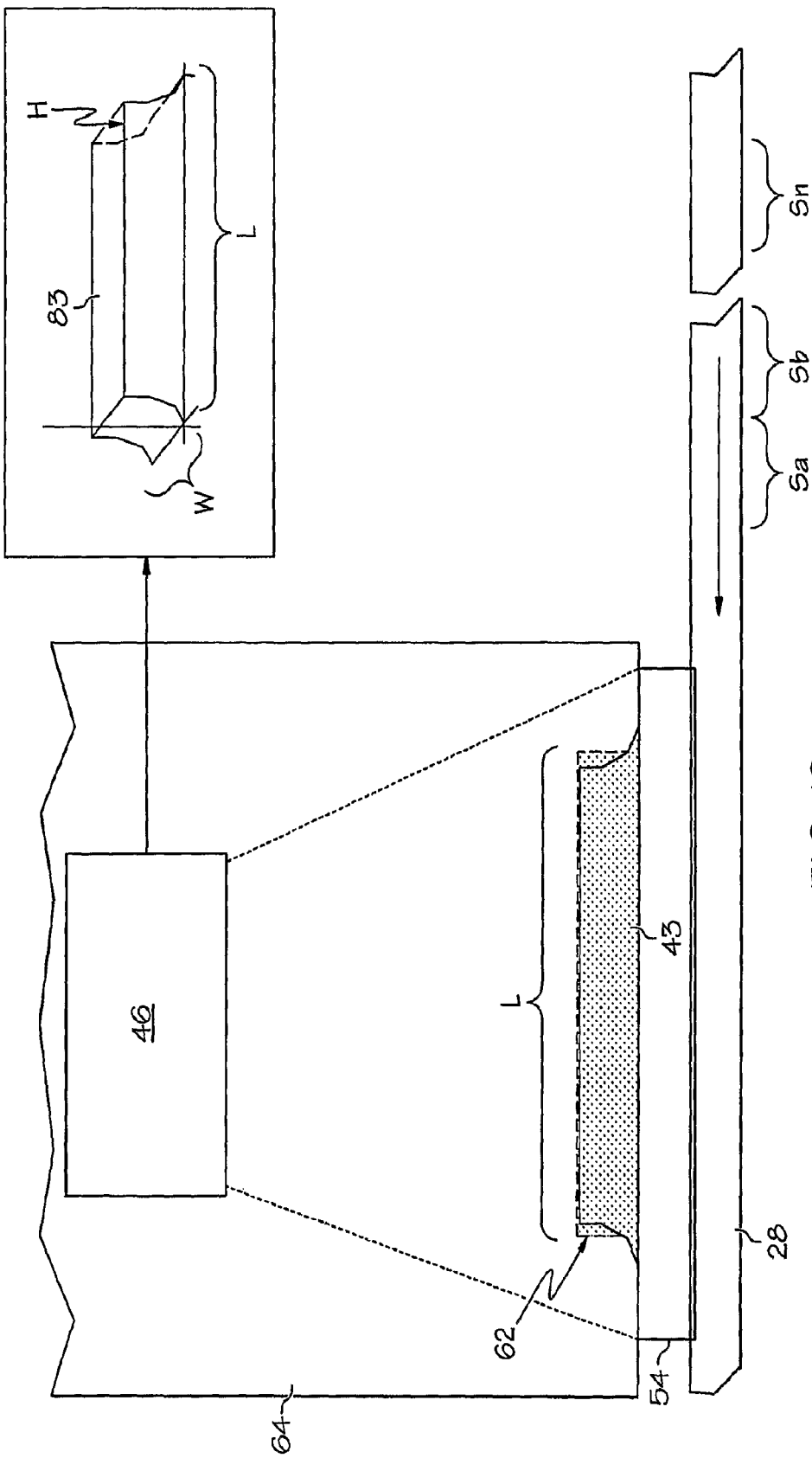
Figure 13:
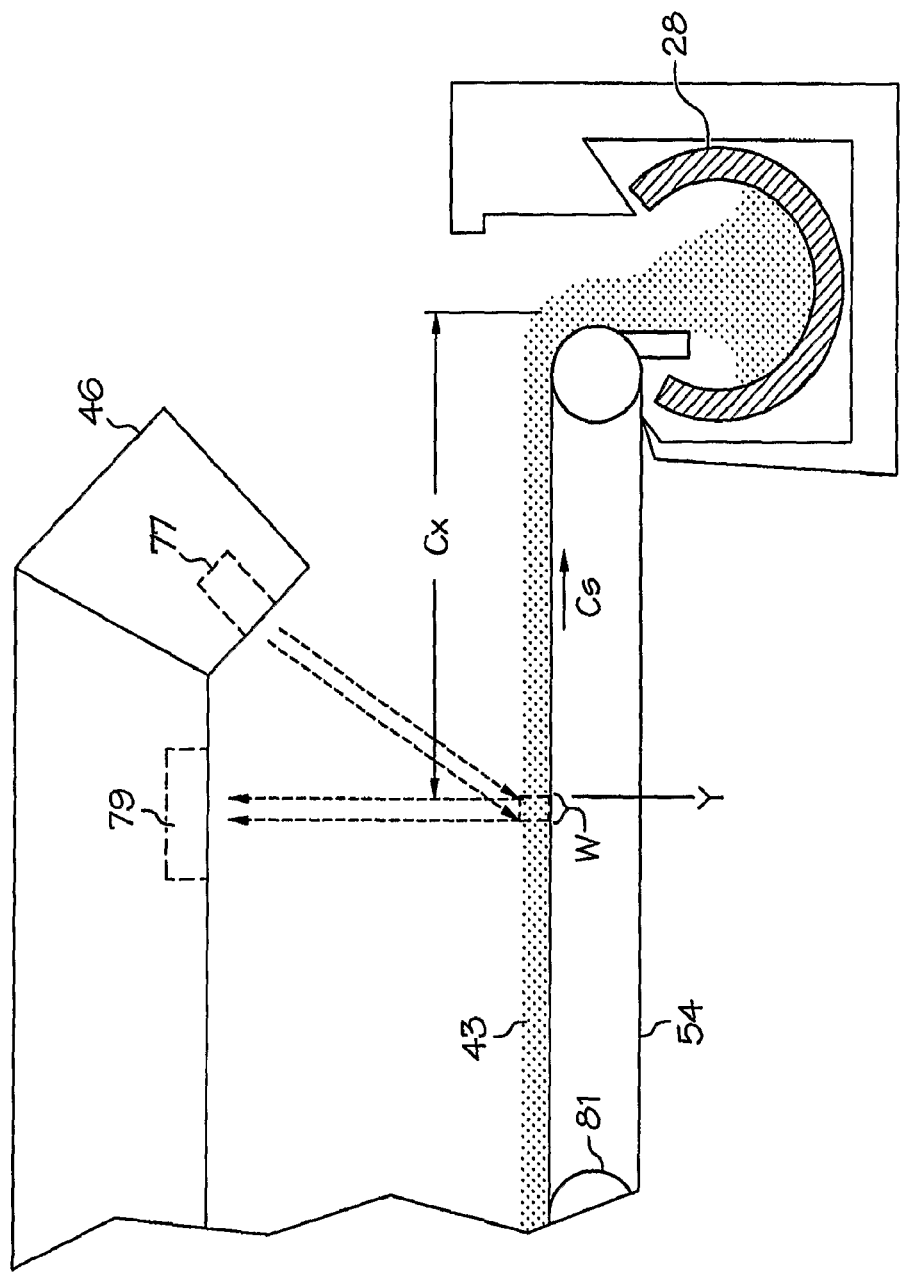

FIGS. 6A, 6B, and 6C are schematic views of a front, top, and a partial side section, respectively, of a fill system according to one embodiment of the present invention;

FIGS. 7A and 7B are schematic section views of a front and a side, respectively, of a fill system according to another embodiment of the present invention;

FIGS. 8A and 8B are schematic views of a side and a side section, respectively, of a fill system according to another embodiment of the present invention;

FIG. 9 is schematic side view of another line embodiment according to the present invention having multiple fill systems;

FIG. 9A is a section view taken along section line 9A-9A in FIG. 9, and showing a cored wire embodiment having multiple fill material layers;

FIG. 10 is a schematic top view of a complete turn-key embodiment according to the present invention;

FIG. 11 is a flow chart of a production method embodiment according to the present invention; and FIGS. 12 and 13 are front and side schematic views of a fill material feeder embodiment according to the present invention and showing a side-to-side length L of a conveyor and a width W from a position Y on the conveyor which defines a unit area.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the various embodiments of the present invention.

The following description of the embodiments of the invention directed to a method and apparatus for making cored wire filled with a powdery and/or granular fill material are merely exemplary in nature, and is in no way intended to limit the invention or its applications or uses.

Figure 1:
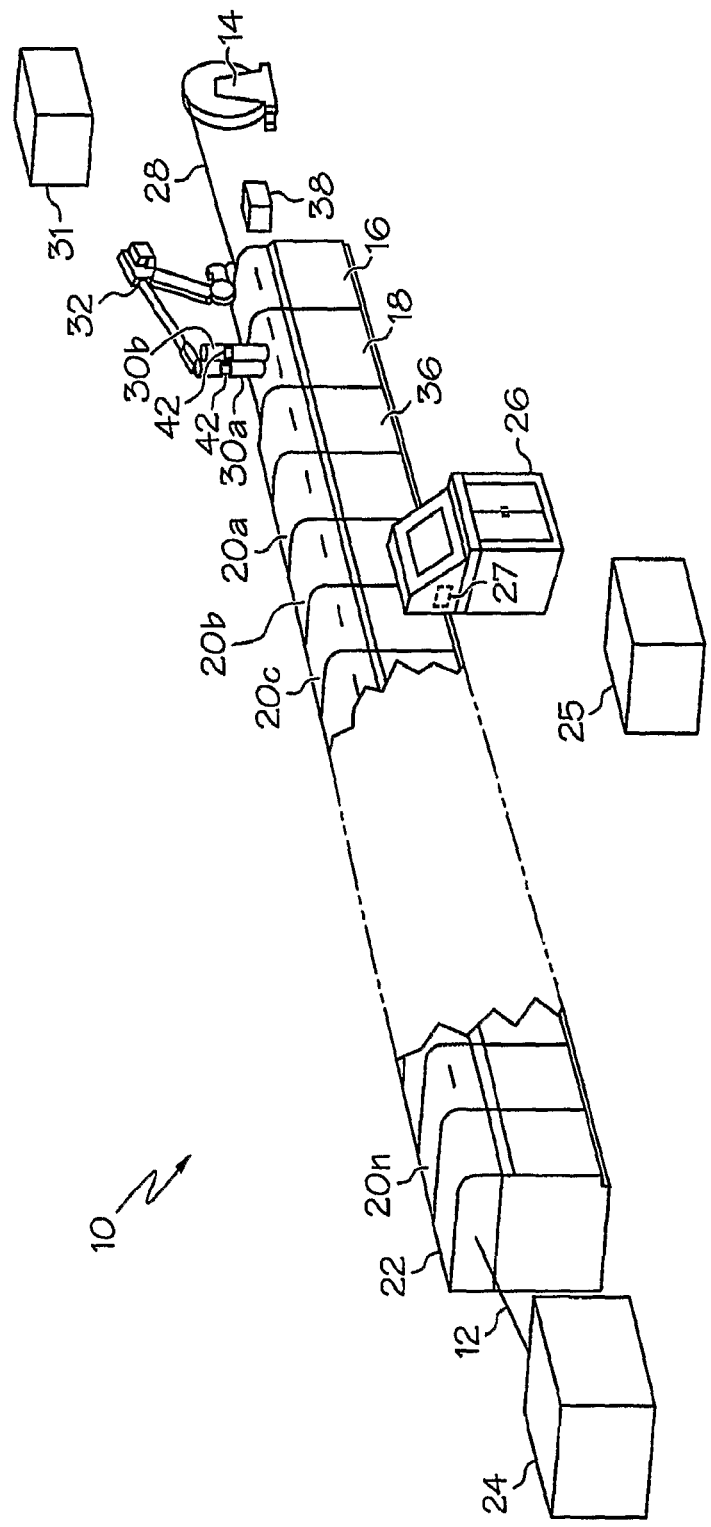
FIG. 1 is an illustration of an equipment production line used in a run to make tubing and cored wire according to an embodiment of the present invention.

FIG. 1 illustrates an apparatus 10 used to make a wire 12 according to the present invention. In one embodiment, the wire 12 is cored wire, and in another embodiment, the wire 12 is hollow tubing. In one embodiment, the wire 12 is a flux cored wire or metal cored wire, and in another embodiment, the wire 12 is filled with superconductive materials, and/or is a superconductor. In one embodiment, the apparatus 10 is rated at producing about 5 million pounds (about 2,267,962 kg) of 0.045-inch (0.1143 centimeter) diameter welding wire per year.

The present invention enables the production of small diameter cored wires and small diameter metallic tubing for a variety of applications. Cored wires for use as a welding electrode can be produced for mild steel, and for high strength/low alloy, like HY80, HY90, HY94, and HY100 (these wires can be produced with very low hydrogen levels, as low as H1, if desired), and tensile strength (psi) of 75 k to 150 k. Small diameter hollow metallic tubing from 0.05 inches (0.127 centimeter) up to 0.5 inches (1.27 centimeters) can be manufactured using the apparatus 10.

The apparatus 10 includes a de-reeler system 14, a strip guide and tube forming station 16, a fill system 18, a plurality of tube reduction stations 20a, 20b, 20c. . . 20n, a wire accumulator 22, a take-up system 24, a conventional line controller 25, and a fill system controller 26. The de-reeler system 14 provides a continuous supply of a flat metal strip 28 to the strip guide and tube forming station 16. After pay-off from the de-reeler system 14, the metal strip 28 is pulled into the entry of apparatus 10 through the strip guide and tube forming station 16.

Figure 4A:
FIGS. 4A-4F are schematic illustration of shapes of the strip at various points along the line of FIG. 3.
Figure 4D:
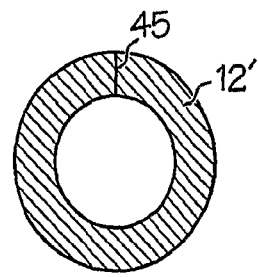
Figure 4B:
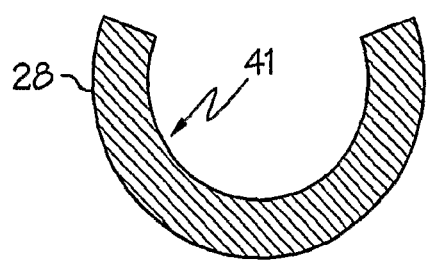
Figure 4E:
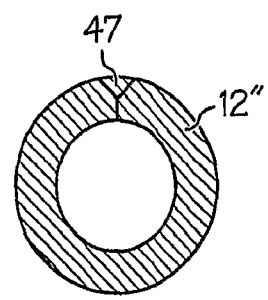

The strip guide and tube forming station 16 shapes the metal strip 28 in a "U" or modified shape to provide a channel for receiving a fill material (see, e.g. FIG. 4B). By this time, the metal strip 28 has already been measured in multiple dimensions (at least width, height, and thickness) by a strip-measuring device 38, which is providing data to the fill system controller 26. The very accurately measured strip dimensions are analyzed in real-time and on a continuous basis during the run by the strip-measuring device 38. In one embodiment, the strip-measuring device 38 is a non-contact measuring device, such as for example, a laser and vision based measuring system. In other embodiments, a contact measuring device may be used to measure strip dimensions.

The metal strip 28 exits the strip guide and tube forming station 16 in the formed U-shape sheath, which is then ready to receive a fill material via one of two material modules 30a, 30b provided to the fill system 18. The fill material is accurately dispensed by the fill system 18 into the formed U-shaped sheath on a continuously variable basis, automatically measured to meet a volume fill which provides less than ±2.0% variance from a desired core ratio for the run. As will be explained in a later section, the fill system 18 is operated in a fashion by the fill system controller 26 to compensate for the following manufacturing variables: strip speed, fill material flow rate, strip variations in dimensions and optionally, fill material density.

In one embodiment, the apparatus 10 according to the present invention incorporates robotic loader 32 and a barcode/RF tag reader 34. The robotic loader 32 operates under programmed instructions from the fill system controller 26 to supply the fill system 18 with the fill material modules 30a, 30b that contain the proper fill material. As is to be appreciated, the barcode/ RF tag reader 34 helps to assure product quality and reduce human error.

It is further to be appreciated that the apparatus 10 reduces many setup steps and operational process interventions by the use of advanced sensor and control apparatuses. The apparatus 10 can produce a wide range of diameters with minimal operator intervention. The apparatus 10 only requires an operator to confirm or quick-change the draw die inserts at each of the stations 16, 36, and 20a, 20b, 20c . . . 20n, to load the correct metal strip 28 from the de-reeler system 14 to the strip guide and tube forming station 16, and then to input parameters into the fill system controller 26 for a fill material: a product number and optionally, a run length, core ratio and then activate the fill system controller 26. By default, if no run length is specified, the apparatus 10 will run until the entire coil of the metal strip 28 on de-reeler system 14 is used.

For a repeat run or a new coil of metal strip 28 on de-reeler system 14, the operator after checking the draw die inserts and loading the correct strip material, may enter or select from a displayed list provided by the fill system controller 26, only the product number. The apparatus 10 then sets itself automatically at each station in the line using the entered parameters or parameters read from a configuration file 27 in memory of the fill system controller 26 that are associated with the product number. For example, the fill system controller 26 instructs the robotic loader 32 to load particular fill material modules 30a, 30b containing the proper fill material identified in the parameters in the fill system 18 from a supply bin 31 holding a plurality of different fill material modules 30a, 30b adjacent the apparatus 10, and provides an initial line run speed for the product number.

The conventional line controller 25 then progressively speeds up the stations to the initial line run speed for the product number, and the fill system controller 26 controls the % volume fill deposited by the fill system 18 into the U-shaped metal strip 28 to achieve the desired core ratio with minimal variation (i.e., less than ±2.0%). In one embodiment, corrections to the line run speed and the parameter values in the configuration file 27 for a particular product number are made during the run, which is discussed in greater details in a later section with reference made to FIGS. 12 and 13. For each product number, the parameters are saved in the configuration file 27 such that the product number may be simply selected for another run without having to enter the other parameters.

A tube-closing station 36 then shapes the filled U-shaped metal strip 28 into an O-shape. The tube reduction stations 20 then reduce the near finished product. It is to be appreciated that the fill system controller 26 provides setup information for the line controller 25 for each product number from the configuration file 27 such as, for example, the line run speed, wire size, and die diameter by station, which sets the number of the individual tube reduction stations 20a, 20b, 20c . . . 20n that will be engaged depending on the finished diameter of the defined job and required draw dies. In addition, each of the stations 16 and 36 provides integral and adjustable tooling sets 23a and 23b. Accordingly, except for possible strip change over, and providing specific draw dies required in each station for each wire diameter, are need for change in tube diameter.

Figure 2:
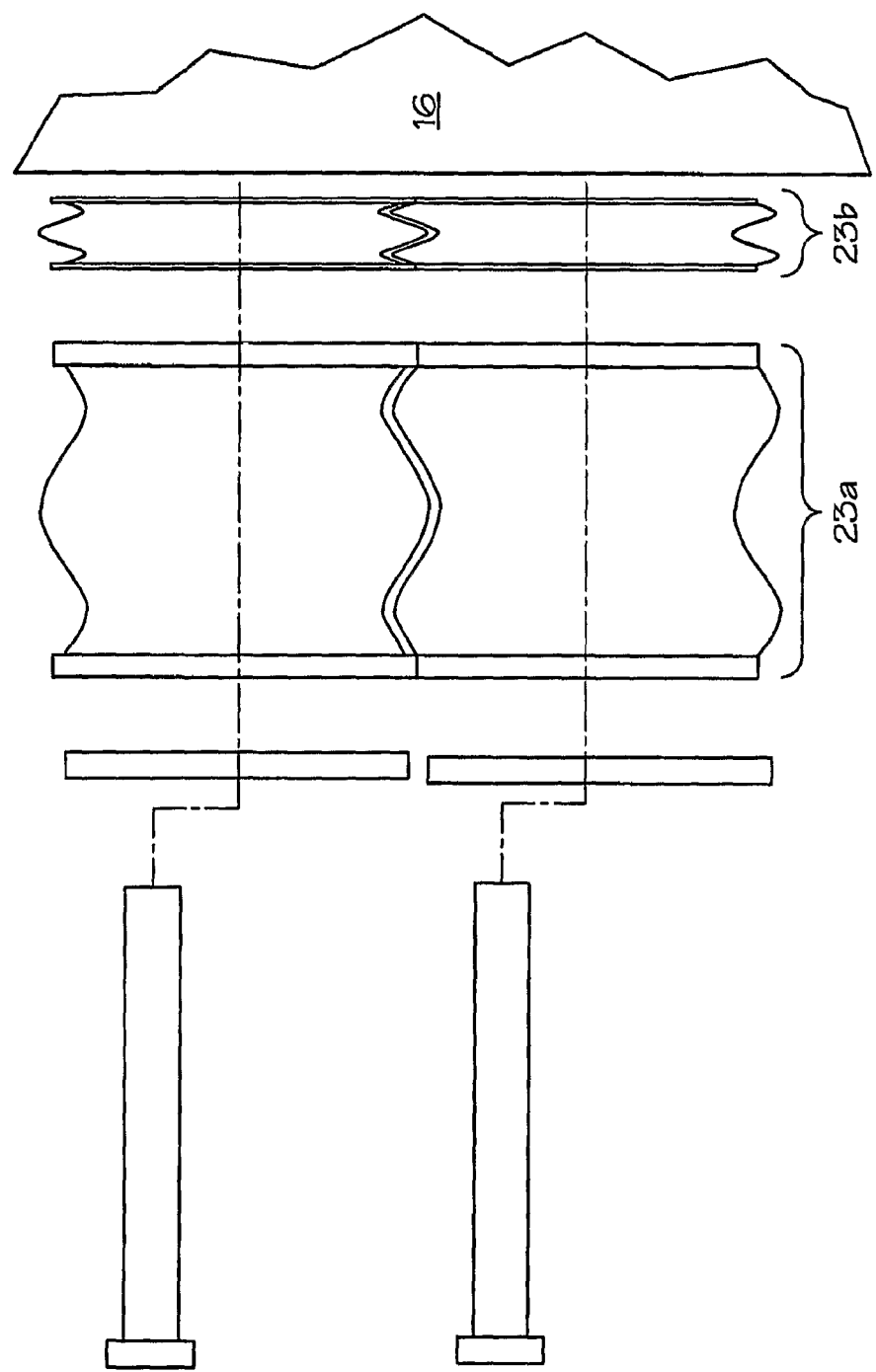
FIG. 2 is a exploded section view of a forming station according to the present invention and showing two sets of tooling side by side thereby allowing an operator to change a strip from one set to the other.

For example, and with reference to FIG. 2, a set of a pair of tooling 23a, 23b is provided to each station, such as tube forming station 16 as shown and discussed herein. Each tooling pair 23a, 23b permits the forming of a particular strip size, and due to being mounted adjacently each other at each station, an operator can quickly select the desired strip size for one run by feeding the strip through one of the tooling pairs 23a, 23b, and then to a next strip size for a subsequent run, by feeding the strip to the other pair without having to change out the tooling at each station. The alternative strip feeds are illustrated by FIG. 6B. In the illustrated embodiment shown by FIGS. 6B and 6C, it is also to be appreciated that an upper portion 15 of the fill system 18 can be transitioned and repositioned horizontally relative to its lower portion 17 such that the end of a belt conveyor 54 is situated properly to feed the fill material into the U-shaped metal strip 28 when using either one of the tooling pairs 23a, 23b. In this manner, change over time is reduced from an average of 4 hours on conventional forming devices to about 20 minutes. With two sets of forming and closing tooling pairs 23a, 23b, the present invention also covers the entire range of wire sizes used in the welding industry. With conventional devices, three sets of tooling to cover the same range of wire (from 0.03 inch (0.0762 centimeter) diameter to 0.125 inch (0.3175 centimeter) diameter) are typical.

After the tube closing station 36, the incoming speed of the formed wire 12 at each tube reducing station 20 is increased automatically exactly to the exit speed of the wire as it exits the previous reducing station. The ideal performance of the apparatus 10 is pre-set by the wire product number entered by the machine operator during setup. Each tube reduction station 20 has its prime speed set by the line controller 25, but sensors are present to fine tune reduction speed in each tube reduction station 20 based on actual wire response as it goes through each tube reduction station 20. These sensors also stop the process if wire failure conditions are sensed.

After reducing, the wire accumulator 22 and take-up system 24 collect the wire 12. The wire 12 is wound onto master coils, which are then heat treated if applicable to the product being produced in a heat treatment furnace 29 (FIG. 10).

Figure 3:
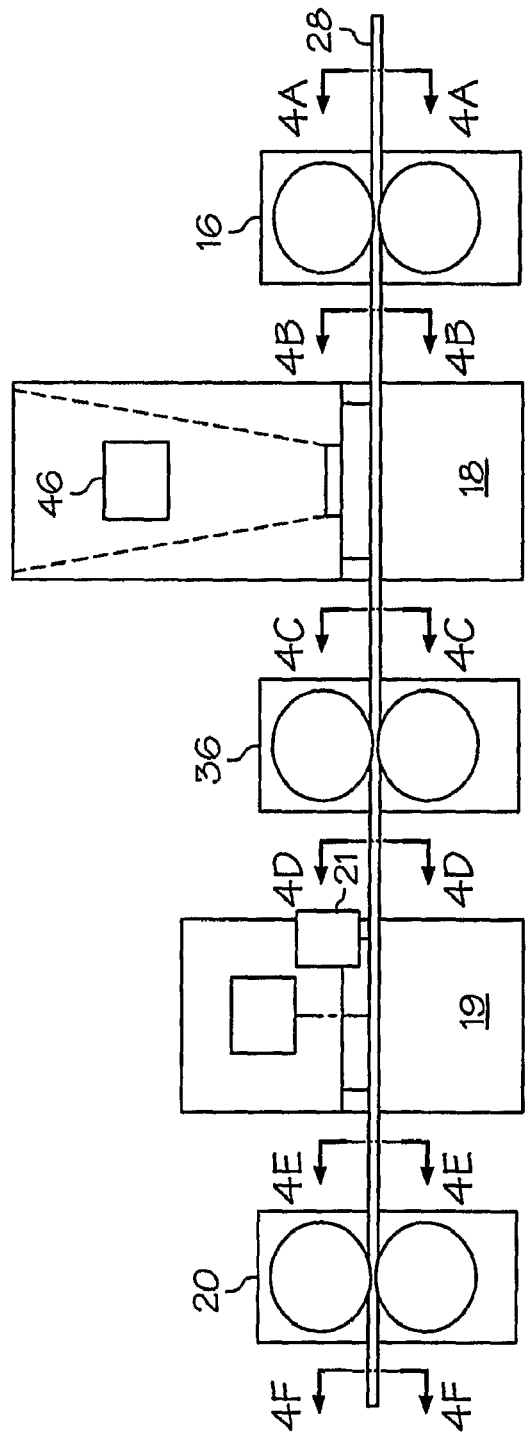
FIG. 3 is a schematic side view of another line embodiment according to the present invention having a fill system and a welding station.
Figure 4C:
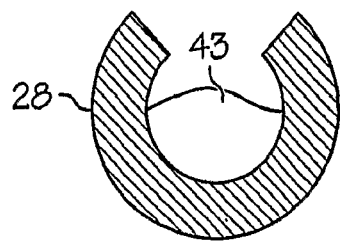

In one embodiment, as illustrated by FIG. 3, the fill system 18 operates with a continuous welding system 19 provided after the tube-closing station 36. In this illustrative embodiment, the continuous welding system 19 is used to weld together the joined edges of the metal strip 28 to produce a near finished product. The shapes of the strip 28 at various points along the line are illustrated by FIGS. 4A-4F. Before entering one or more tube forming stations 16, the strip 28 is a basically flat as shown by FIG. 4A, and after leaving the tube forming station(s) 16, the strip 28 has a U-shape or channel 41 as depicted by FIG. 4B. After leaving the fill system 18, the channel 41 now contains a quantity of the fill material 43 as shown by FIG. 4C.

Figure 4F:
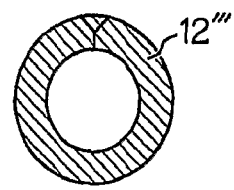

Next, the channel 41 is closed, thereby enclosing the fill material 43 therein, via the tube-closing station 36, which results in the strip 28 now being shaped as wire 12' as depicted by FIG. 4D. In one embodiment, a seam tracking weld control 21 is also provided to align the welding system 19 to the moving seam to ensure that seam 45 of the wire 12' is welded, which results in a weld 47 in the wire 12" as depicted y FIG. 4E. Next, the welded, core filled wire 12" is worked by one or more tube reduction stations 20 until a desired final diameter for a core filled wire 12''' is produced as depicted by FIG. 4F. As the working of the core filled wire 12" to a desired final diameter is conventional, such as for example, to produce finished wire 12 (FIG. 1), no further discussion is provided.

Optionally, if only hollow tubing is to be produced, then in one embodiment the fill system 18 may be conveniently turned off (or replaced) and the line depicted by FIG. 3 can be run with the strip guidance and tube forming station 16 and the continuous welding system 19. In one embodiment, the continuous welding system 19 is a laser seam welder. Production runs at speeds up to 2000 feet/minute (609.6 meters/minute) are envisioned in the line embodiment for producing hollow tubing.

Figure 5:
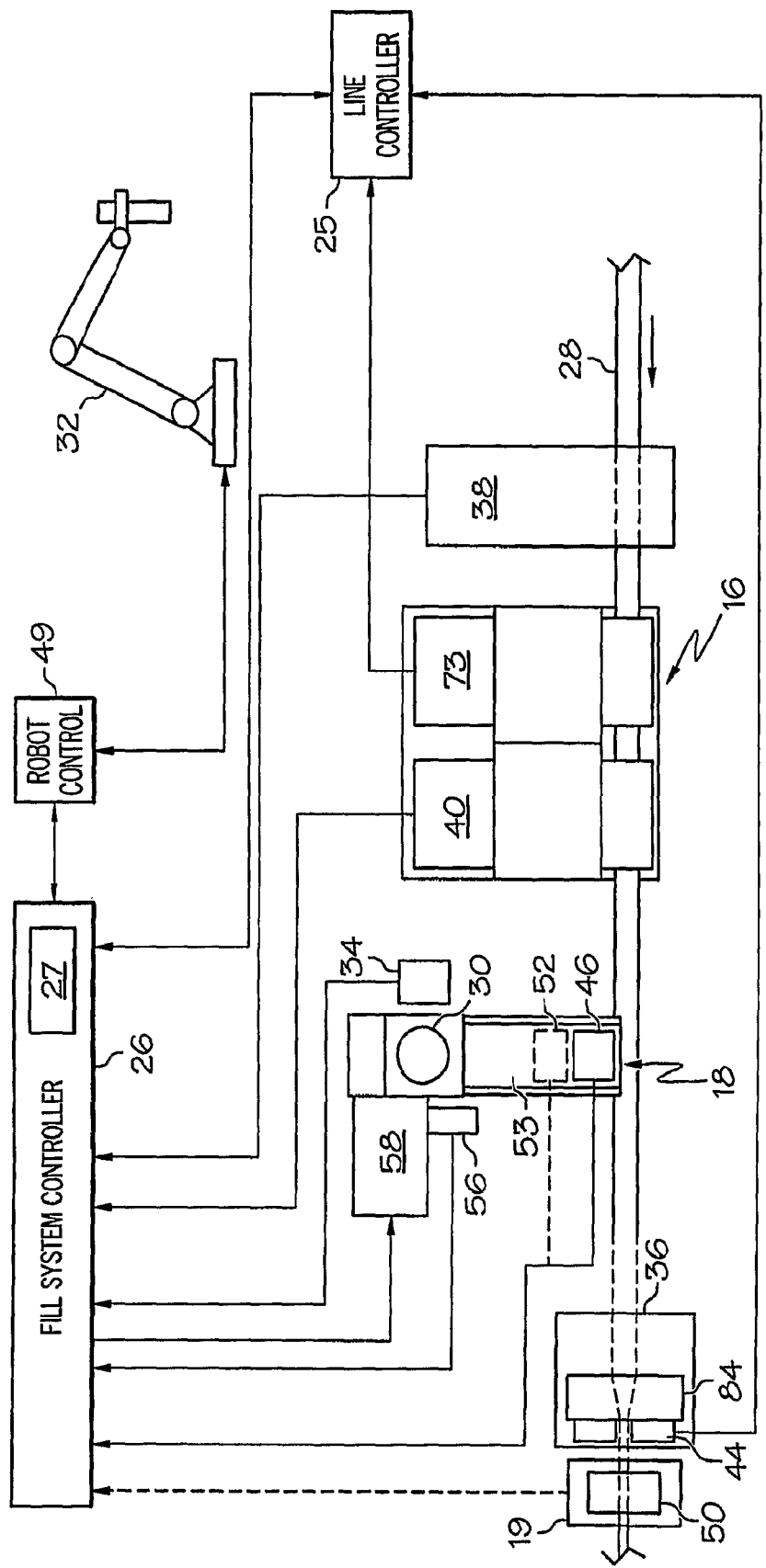
FIG. 5 is a block diagram of a fill system controller according to an embodiment of the present invention which controls automatically depositing fill material used in cored wire manufacturing via accounting for a variety of process changes, such as, for example, variations in strip feed, strip width, strip thickness, powder flow, and powder density.

With reference made to FIG. 5, a block diagram of the fill system controller 26 according to an embodiment of the present invention is shown. As a part of the manufacturing process, the fill system controller 26 in one embodiment uses a continuous data stream from at least four sensors measuring a number of process variables. In one embodiment, the fill system controller 26 is provided measurements of strip width and thickness via the strip-measuring device 38, strip speed before the fill system 18 via speed sensor 40, a determination of a quantity of fill material per a dispensing volume of the fill system 18 via a fill material measurement device 46 in order to compute a needed fill volume, and speed of a fill material metering device 53 of the fill system 18 via an encoder 56. As will be explained in greater detail in a later section, the speed at which the fill metering device 53 provides each dispensing volume is adjusted automatically by the fill system controller 26 to dispense a number of the dispensing volumes (i.e., volume buckets) or a portion thereof of the fill material into the channel 41 of the strip 28. (FIG. 4B) to provide the needed fill volume of the fill material. The measurement device 46 in one embodiment is a machine vision based measurement system, and another embodiment is a laser and vision based measurement system integrated in the fill system 18.

In one embodiment, the fill system controller 26 also receives other data such as an identification of the type and quantity of the fill material via the reader 34 reading a barcode or RF tag 42 (FIG. 1) provided on fill material module 30, responses of the robotic loader 32 via a robotic loader controller 49, and line run conditions and statuses via the line controller 25. Such data also ensure accurate metering of the fill material from the fill metering device 53 into the U-shaped metal strip 28.

In another embodiment, a force sensor 44 is provided adjacent a tooling or reducing die 84 provided in one of the reduction stations 20 (FIG. 1). The force sensor 44 measures the reducing force applied to the filled tube. In this embodiment, the measurement of the reducing force is provided by the line controller 25 and compared by the fill system controller 26 to known nominal conditions for quality control assurance. As a quality control measurement, a reducing force greater than an acceptable value correlates to a higher volume of fill material than specified, and a reducing force lower than an acceptable value correlate to a lower volume of fill material than specified.

In one embodiment, if the measured reducing force is out of specification, then the fill system controller 26 will instruct the line controller 25 to shut the line down, and provide the operator with an indication of what is wrong and how to correct the problem. In another embodiment, if the measured reducing force is out of specification, then the fill system controller 26 flags the section of wire 12 as a low fill material fill in a data file. In another embodiment, if the reducing force is out of tolerance for a predetermined period, the fill system controller 26 will instruct the line controller 25 to shut the line down, and again provide the operator with an indication of what is wrong and how to correct the problem.

Optionally in one embodiment, a tube-welding sensor 50 is provided to permit the fill system controller 26 to control weld penetration of the welding system 19 when provided in certain embodiments so as not to damage the fill materials, such as for example, superconductive materials. In addition, optionally in one embodiment, a force sensor 52 may be situated under a component of the fill metering device 53 of the fill system 18. For example, in the embodiment shown by FIG. 6C, the force sensor 52 is provided under the belt conveyor 54 which is used to dispense the fill material into the U-shaped metal strip 28. In the embodiment shown by FIG. 7A, the force sensor 52 measures the addition of the fill material provided to a section of a screw 70 which then is provided to U-shaped strip, and in the embodiment depicted by FIG. 8B, the force sensor 52 measures the load being feed by a screw feeder 71. In such embodiments, the force sensor 52 measures the weight of the fill material delivered by the fill metering device 53 to ensure accurate measurements of fill material deposited in the strip 28. In one embodiment, the force sensor 52 supplements the measurements taken by the measurement device 46, and in another embodiment, one of the measurement device 46 and the force sensor 52 is used as a back up to the other.

The encoder 56 is used to accurately control a servomotor 58 used to deliver an accurately measured fill material volume by the fill metering device 53. In one embodiment illustrated by FIGS. 6A, 6B, and 6C, the fill metering device 53 includes a belt conveyor 54 which the servomotor 58 drives to deliver the fill material to the U-shaped metal strip 28 located at the end of the belt conveyor 54. In another embodiment depicted by FIGS. 7A and 7B, the fill metering device 53 includes the screw 70 which is driven by the servomotor 58 to deliver the fill material to the U-shaped metal strip 28 which is position below the screw 70. In still another embodiment which is shown by FIGS. 8A and 8B, the fill metering device 53 includes the screw feeder 71 which is driven by the servomotor 58 to deliver the fill material to the U-shaped metal strip 28.

In operation, if the measurements of the strip 28, via strip-measuring device 38, are less than nominal, the fill system controller 26 will command the servomotor 58 to slow down the delivery of the fill material volume to the strip 28 via the metering device 53. Likewise, if the measurements of strip 28 are larger than nominal, the fill system controller 26 will increase the delivery of fill material volume to the strip 28 via speeding up the servomotor 58 of the metering device 53. In one embodiment, the measurement device 46 provides data to the fill system controller 26 on the fill material volume that can be provided to the strip 28 via the metering device 53. In another embodiment, the measurement device 46 and the force sensor 52 provide data to the fill system controller 26 on the fill material volume and density, respectively, that can be delivered to the strip 28 by the metering device 53. In one embodiment, the measurement device 46 measures the volume of the fill material provided by the metering device 53 a significant number of times per second.

With reference again to FIGS. 6A, 6B, and 6C, one embodiment of the fill system 18 is shown. In this illustrative embodiment, the servomotor 58 controls the speed of the belt conveyor 54. A fixed height port 62 of a fill material hopper 64 delivers a fixed amount of the fill material onto the belt conveyor 54 from an open one of the fill material modules 30a, 30b (FIG. 1). A selection module 63 seated atop of the hopper 64 and provides a pair of seats 65 for supporting each of the fill material modules 30a, 30b thereon. Each of the seats 65 has an actuator 67 which opens a closure (not shown) at an end of each fill material module 30a, 30b. Each actuator 67 is independently controlled by the fill system controller 26 and when actuated, the fill material dispenses from a seated and opened module into the hopper 64. In one embodiment, the robotic loader 32 (FIG. 1) delivers and takes away the module(s) 30a and/or 30b (i.e., full and empty fill material modules) to and from the seats 65, and to and from the supply bin 31. In one embodiment, the fill material modules 30a and 30b are elongated tubes, and in other embodiments, may be any geometric shape suitable for delivery of a measured quantity of the fill material to the hopper 64. The hopper 64 in the illustrative embodiment also controls delivery of the fill material onto the belt conveyor 54 via a narrowing interior width 66.

FIGS. 7A and 7B are schematic front and side section views, respectively, of a fill system 18 according to another embodiment of the present invention. This device uses a screw 70 which is driven by servomotor 58. The screw 70 has a profile that will not release fill material when the process comes to a stop. The screw 70 is set on the force sensor 52 that measures the weight of the fill material on the screw 70. A level sensor 76 measures the level of fill material in the hopper 64. The data from the force sensor 52 and level sensor 76 and the data corresponding to the strip 28 from the strip-measuring device 38 (FIG. 5), is processed through the fill system controller 26 producing a control signal to the servomotor 58. The fill system controller 26 controls the servomotor 58 to deliver the quantity by weight of the fill material that is necessary to hold production of the cored wire 12 within specification. Speed of the servomotor 58 is accurately measured via the encoder 56, which provides feedback to the fill system controller 26, which the fill system controller uses, as well as with the continuous data from the force sensor 52 and level sensor 76, to ensure that the correct quantity by weight of the fill material for each measured segment of the U-shaped metal strip 28 is delivered.

Optionally, in the embodiment shown by FIG. 7A, a vision camera 80 is used to look into the U-shaped metal strip 28 to determine whether the level of fill material provided by the screw 70 is within tolerance. Trending performed by the fill system controller 26 on the detected fill material levels can be used to determine whether the quantity of the fill material provided are approaching an out of tolerance upper or lower limit. When such a trending condition occurs, the fill system controller 26 can adjust the delivery of the fill material by adjusting the rotation speed of the screw 70 in order to reverse the trend and keep the process within tolerance.

FIGS. 8A and 8B illustrate an alternative embodiment to the screw embodiment of FIGS. 7A and 7B. In this embodiment, the screw feeder 71 is operated and controlled in a similar manner as screw 70. The screw feeder 71 is set on the force sensor 52 that measures the weight on the fill material carried in the screw feeder 71. The level sensor 76 measures the level of powder in the hopper 64. The data from the force sensor 52 and level sensor 76 is processed through the fill system controller 26 producing a control signal to the servomotor 58. The fill system controller 26 controls the servomotor 58 to deliver the quantity by weight of the fill material that is necessary to hold production of the cored wire 12 within specification. Speed of the servomotor 58 is accurately measured via the encoder 56, which provides feedback to the fill system controller 26, which the fill system controller uses, as well as with the continuous data from the force sensor 52 and level sensor 76, to ensure that the correct quantity by weight of the fill material for each measured segment of the U-shaped metal strip 28 is delivered. Optionally, trending data may also be used as discussed with the embodiment shown by FIGS. 7A and 7B.

FIG. 9 is schematic side view showing another line embodiment according to the present invention having multiple fill systems 18a, 18b, 18c, 18d. The multiple fill systems 18a, 18b, 18c, 18d enable the feeding of a number of powders in layers in the U-shaped metal strip 28, such as for the manufacture of superconductors. FIG. 9A is a section view taken along section line 9A-9A in FIG. 9, and showing an embodiment of a cored wire 13 produced by the line and having multiple fill material layers 43a, 43b, 43c, 43d.

FIG. 10 is a schematic top view of a complete turn-key embodiment 99 according to the present invention. The turn-key embodiment comprises a pair of the apparatuses 10, dual controlled heat treatment furnaces 29, dual wire packaging apparatuses 33, and optional coil storage units 35. After cooling, the product is rewound on smaller coils via the wire packaging apparatuses 33 to suit customer or industry standards.

According to the present invention, the heat treatment furnaces 29 provide uniform heating and are equipped with a controlled atmosphere of higher pressure, super-dry mixed gases. This controlled atmosphere in the heat treatment furnaces 29 produces a patina that reduces rust and improves current pick-up of the core filled wire when used in the welding process. In one embodiment, the fill system controller 26, to facilitate a controlled heat treatment, controls the heat treatment furnaces 29. In one embodiment, the controlled heat treatment comprises performing a burn-off up to about 400° Fahrenheit (204.44 degrees Celsius). Next, a flow of a controlled atmosphere above atmospheric pressure is introduced which comprises a super-dry heated mixture of air and at least one gas, such as nitrogen and/or other inert gases, is introduced in the furnace at up to about 625° Fahrenheit (about 329.44 degrees Celsius). In one embodiment, the inert gas is 30-40% of the mixture. The air before mixing is cooled to reduce moisture content to below 25%. During this heat cycle, 25% of the atmosphere is circulated back to the heat treatment furnace 29.

Next, the wire is cooled down in the controlled environment, and removed to a cooling space when reaching about 125° Fahrenheit (51.67 degrees Celsius). The controlled heat treatment creates a very tight low porosity smooth oxide on the wire surface to increase storage life. It has also been found that the oxide surface is highly desirable for feeding wire to the welding arc because the wire has a very thin tight oxide and is clean, and therefore does not bring material to the tip, which provides a more consistent arc and eliminates arc flutter and outages. The above described furnace treatment allows for the production of very low weld-metal hydrogen levels, and in one embodiment, as low as H1.

In use, the following processes are performed according to a method of the present invention, which is illustrated by FIG. 11. Reference is also made to FIGS. 1, 5, and 10. It is to be appreciated that the hereafter identified processes do not necessarily need to be performed in the order presented or even sequentially, and are only provided as such for illustration and discussion. In step 100, the operator enters the product number to be run and optionally, the total wire length desired (via the fill system controller 26). The fill system controller 26 sets automatically or provides to the operator the following variables by reading the data corresponding to the product number from the configuration file 27 in step 105: the fill material ; the core ratio, the tolerance % (i.e., the desired core ratio range) ; the number of active draw stations; tooling identity (wire diameter by station); the run speed based on incoming strip speed (which is set by the line controller 25 and monitored by speed sensor 73 as shown in FIG. 5); and incoming strip size (width×thickness). Any special instructions to operator are displayed by the fill system controller 26 on a monitor (not shown), including draw dies required, mill stand settings, or other special setup provisions to be installed.

Next, in step 110 the operator or robotic loader 32 loads the correct fill material cartridges (FIG. 1). When loaded, a barcode or radio frequency (RF) tag 42 on the fill material module 30 is read by the reader 34 in step 120 to identify the loaded fill material and the bulk density of the fill material to the fill system controller 26. As a safety feature, the apparatus 10 will not run if the barcode or radio frequency (RF) tag 42 on the fill material module 30 does not match the specified fill material in the configuration file 27 the fill system controller 26. Next, in step 130 the operator confirms or manually changes the tooling dies in the tube-closing station 36 and the tube reduction stations 20 as specified by the fill system controller 26. An optional electronic identification can be provided on each tooling die, which is read by the fill system controller 26. If such electronic identification is provided, then in step 140, if the wrong die diameter is used or there is a mismatch by a tube reducing station 20, then the apparatus 10 also will not run, and an appropriate error message will be provided by the fill system controller 26 to the operator. Otherwise, if such identification is not provided, then step 140 is skipped.

The operator then feeds in step 150 the strip 28 into the strip guide and tube forming station 16. In step 160, the fill system controller 26 confirms that the loaded metal strip 28 is correct by taking measurements of the strip material using the strip-measuring device 38 (FIG. 5). Optionally, a barcode or RF tag on the strip material reel can be read by the fill system controller 26 to also confirm that the correct/non-correct strip material is loaded in step 160. When confirmed, the fill system controller 26 provides a ready indication to the operator. The operator then feeds the metal strip 28 through the fill system 18, the tube-closing station 36, and then as wire, through all the remaining reducing stations of the apparatus 10 and connects the wire to the take-up system 24 (FIG. 1) in step 170. The operator then actives the apparatus 10 for continuous production run in step 180. The apparatus 10 will accelerate to the specific incoming strip speed as indicated by the speed sensor 73, and then will hold steady for the production run. A production run of the apparatus 10 is envisioned at speeds of above 3000 feet/min (914.4 meters/minute) more or less depending on wire size.

In step 190, the fill system controller 26 and line controller 25 monitor the performance of the fill system 18 and the line, respectively, and self adjust when necessary. For example, and as will be explained in greater detail in a later section, the fill system controller 26 monitors the strip dimensions and adjusts automatically the quantity of the fill material delivered to the channel of the strip to achieve the specified core ratio. Also during the production run, the fill system controller 26 will instruct the robotic loader 32 to tender the fill material modules 30a, 30b (FIG. 1) to keep the fill system 18 full of the fill material. In addition, the fill system controller 26 will update the data for the product number, along with a run number identifier, in the configuration file 27 to better reflect detected run conditions. In this sense, it is to be appreciated that the fill system controller 26 uses the detected parameters to refine the parameters originally provided in the configuration file 27 which can be used for the next run of the product number. In step 200, the fill system controller 26 checks to see if a stop condition exists. Such stop conditions, include, for example, the end of the production run for the entered run length, the strip material on the de-reeler system 14 is empty, the core ratio is out of the core ratio range, the supply of the fill material is exhausted, the reducing force is out of specification, and wire breakage or jam in the apparatus 10. As mentioned above previous, the fill system controller 26 will instruct the line controller 25 to shut the line down when a stop condition exists, and if something is wrong, will provide the operator with an indication of what is wrong and how to correct the problem. In this step, the operator also may review the readouts, observes operations of the apparatus 10, and intervenes if required as well as monitoring visual and audible commands from the fill system controller 26.

At the completion of a production run, or when the take up reel is full, the operator then removes the full reel from the take-up system 24 (FIG. 1) and puts in a new empty one in step 210. The full reel is place into a temporary cueing station, such as storage unit 35 (FIG. 10), waiting for transfer into the heat treat apparatus. The full reels go into a heat treatment furnace 29 in step 220 with a unique temperature cycling and super mixed-dry gases under elevated pressures and temperatures.

After completing the designed heat treating process, multiple reels come out of the heat treatment furnace 29 through a cooling cue and onto the wire packaging apparatuses 33. The cored wire at this point is relatively insensitive to room temperature or relative humidity. In step 230, the wire is de-reeled and put on various package size and configurations, based on customer need, the packaged per customer requirements. A detailed discussion on a method of the present invention to accurately provide a quantity of the fill material into the U-shaped metal strip 28 to ensure that the produced core filled wire is in an improved core ratio range now follows.

As mentioned above, after pay-off from the de-reeler system 14, the metal strip 28 is pulled into the strip guide and tube forming station 16. The metal strip 28 exits the strip guide and tube forming station 16 with a channel in a "U" or modified shape, which is opened upwardly to receive the fill material as shown for example by FIG. 4B. By this time, as also mentioned previously above, the metal strip 28 has been measured in multiple dimensions by the strip-measuring device 38, which is providing data to the fill system controller 26. In this manner, very accurately strip dimensions for defined strip segments are determined in real-time, and on a continuous basis such as, for example, strip segments Sa, Sb . . . Sn, as illustrated by FIG. 12.

In one embodiment, the strip dimensions for each strip segment Sa, Sb . . . Sn are used to solve for the weight of each strip segment. The weight of each segment Sa, Sb . . . Sn is simply computed by the fill system controller 26 by multiplying the volume of each segment, as determined by the measured multiple dimensions from the strip-measuring device 38, with the unit density of the strip 28. As explained hereafter, the weight of each strip segment Sa, Sb . . . Sn is then used by the fill system controller 26 to adjust accurately the quantity of the material deposited into the channel to ensure that each strip segment is in a desired core ratio range. In one embodiment, the variance from a desired core ratio (i.e., a core ratio range) is less than about ±2% and adjustable down to about ±0.5% depending on application, wire diameter, and core formulation.

As mentioned above, the core ratio is the weight of the fill material(s) divided by the total weight of wire (including the core of the fill material), which is multiplied by 100 to provide a percentage. For example, for producing a cored wire, a standard cold rolled strip size available for the metal strip 28 is 0.024 inch (0.06096 centimeter)×0.500 inch (1.27 centimeters), and provided from a steel manufacture with a typical variation of+0.006 inch (0.01524 centimeter) in thickness and ±0.005 inch (0.0127 centimeter) in width from the nominal dimensions per shipped coil length (e.g., feet of wire per coil). The present inventors have found that when setting up for a production run using only the nominal strip dimensions (e.g., 0.024 inch (0.06096 centimeter)×0.500 inch (1.27 centimeters)), such variations in strip dimensions over the run can result in an about a 23% change in the quantity of powder needed to maintain a 17% core ratio specification from the high-side strip variation (i.e., 0.030 inch (0.0762 centimeter)×0.505 inch (1.283 centimeters)) to the low-side strip variation (i.e., 0.024 inch (0.06096 centimeter)×0.495 inch (1.257 centimeters)). For this reason, prior art methods since not taking into account strip dimension variations, have been only able to achieve at best run speeds of up to about 250 feet per minute (about 76.2 meters/minute) material fill rates, above which the variation in desired core ratio becomes greater than ±2% which is out of the core ratio range bounding the desired core ratio. The present invention, however, experimentally has achieved run speeds up to 750 feet per minute (228.6 meters/minute), maintaining within a ±0.5% core ratio range of the desired core ratio of 17% due to continuously measuring the strip dimensions in order to adjust accurately and automatically the quantity of the material deposited into the channel for each strip segment.

To adjust accurately the quantity of the material deposited into the channel for each strip segment, in one embodiment, the weight per unit area of the material to be dispensed is measured by the system. In one embodiment, the unit area is defined by a side-to-side length L of the belt conveyor 54 and a width W from a position Y on the conveyor as shown by FIGS. 12 and 13. In one embodiment, the unit area corresponds to the imaging area of the fill material measurement device 46. In another embodiment, the unit area corresponds to the weighing area of force sensor 52 (see, e.g., FIG. 6C).

In a laser vision system embodiment in which the metering device 53 uses belt conveyor 54 to transport and dispense the fill material 43, the weight of the fill material per unit area (L×W) in transport on the belt conveyor 54 is readily determined by measuring the volume of the material (L×W×H) and multiply the measured volume with the bulk density (weight per unit of area) of the material as specified by the bar code or RF tag 42 provided on the fill material module 30a, 30b (FIG. 1). The height H of the material in the unit area (L×W) is determined by taking an image 83 of the material at position Y in transport on the belt conveyor 54 with a laser 77 and imaging device 79 of the fill material measurement device 46. The image 83 is provided at a low-angle of incidence relative to the transport plane, such that a cross-sectional area of the fill materiel 43 in pixels having complete height profile H is provided. The fill system controller 26 then uses the data signal of the image 83 to determine the volume of the fill material contained on the identified section of the moving belt conveyor 54 (i.e., L×W) using conventional image processing.

In one embodiment, the fill system controller 26 then uses the volume of the strip segment provided by the strip-measuring device 38 and multiples it by the weight per unit of area to determined the weight of the segment, for example Sa. The reciprocal of the weight of the segment Sa is then multiplied by 1-x, where x is the numerical value of the desired core ratio (e.g., 17%, x=0.17), to give the total weight of the strip segment Sa and fill material. The total weight of the strip segment Sa and fill material is then multiplied by the core ratio to give the weight of the fill material needed to be delivered by the belt conveyor 54 to the strip segment Sa.

To deliver the proper quantity of the fill material 43 from the belt conveyor 54, the fill system controller 26 then takes speed of the segment Sa as provided by the speed sensor 40, and multiples it by the weight of the fill material needed to be delivered by the belt conveyor 54 to find the weight of the fill material per unit of time needed for segment Sa. The weight of the fill material per unit of time as determined above is then divided by the weight of the fill material per the unit area (L×W) of the material in transport on the belt conveyor 54 to find the width (W) of the fill material on the belt needed to be delivered to strip segment A. The fill system controller 26 then divides the circumference of a drive wheel 81 around which the belt conveyor 54 rotates by the weight of the fill material per unit of time to find the revolution per minute (RPM) that the drive wheel 81 needs to be driving the belt conveyor 54 in order to deliver to strip segment Sa the needed quantity of the now precisely measured fill material 43 in transport on the belt conveyor 54. The fill system controller 26 then takes the determined RPM, multiples it by the gear reduction ratio of the servomotor 58 (FIG. 6C) to get the needed motor RPM.

The fill system controller 26 then uses the location and speed of the beginning of the wire segment Sa, the known distant from position Y to the end of the conveyor, i.e., distant Cx, and the current speed of the belt conveyor 54 via encoder 56 ((FIG. 5), to compute the timing in which to make the speed adjustment of the servomotor 58 to the needed motor RPM to ensure that the quantity of fill material 43 deposited into the channel of segment Sa meets the core ratio with less than ±2% down to about ±0.5% variation. Such computations and speed adjustments are performed continuously during the run for each subsequent strip segments, e.g., Sb . . . Sn. It is to be appreciated that the fill system controller 26 in one embodiment provides a record of the quantity of material dispensed per segment in each run, which can be used to substantiate the quality of the cored wire produced in meeting the desired core ratio specification.

In another embodiment, such as in the embodiments using screw 70 or screw feeder 71 and the force sensor 52 (e.g., FIGS. 7B and 8B), the fill system controller 26 divides the weight of the fill material needed to be delivered by the metering device 53 to the strip segment Sa, computed as mentioned above, by the weight of the fill material in a known volume of the screw 70 or screw feeder 71. It is to be appreciated, that the weight of the fill material per the known volume of the screw 70 or screw feeder 71 represents a quantity or volume bucket to be dispensed from the metering device 53 into the channel of the strip 28. Accordingly, the division of the fill system controller 26 determines how many volume buckets nB, where n=1 to x, of fill material are needed to be delivered to segment Sa. As before, the fill system controller 26 then uses the location and speed of the wire segment Sa, and the needed speed adjustment of the servomotor to determine the timing in order to dispense the number of volume buckets nB to ensure that the quantity of fill material 43 (i.e., the number of volume buckets nB) deposited into the channel of segment Sa meets the core ratio with less than ±2% and adjustable down to about ±0.5% variation.

Although not limited thereto, it is noted that the above described present invention has the following features and advantages. The controlling of the mass volume of the fill material flowing into the outer sheath regardless of atomic weight and speed enables the production of a product at higher speeds and which is better than "industry best" accepted quality standards. The automation and control apparatuses have full sensing and reaction controls that insure highest quality finished wire with minimum intervention by machine operators. In addition, the more precise and consistent fill throughout each coil length of wire due to the automated fill system 18 permits the use and blending of very fine powders from 150 mesh down to 400 mesh into a homogeneous mixture having a balance up to about 40% 400 mesh fill material. This blending thus eliminates matrix material segregation for a wide range of atomic weights. Because combined powders have a final consistency that flows with little or no segregation, the product has more consistent weld chemistry and mechanical properties. Precise wire reduction and speed control of the present invention also reduces wire twists and keeps the wire seam of the outer sheath in one radial location, thereby improving better feeding of the wire to the arc tip to minimize wandering arc, pulsating arc, and repairs or down time associated with these problems. In addition, using finer powders (i.e., 400 mesh), reduces powder cost up to 20%.

With the present invention, in one embodiment, very small cored wire in the range of about 0.03 inch (about 0.0762 centimeter) to about 0.25 inch (about 0.635 centimeter) final diameter with ±0.5% variation from a desired fill ratio can be provided.

In another embodiment, the present invention maintains the powder control of ±0.05% variation from a desired core ratio at strip feed speeds up to 600 ft/min (182.9 meters/minute), thereby allowing for above 1500 pounds (680.4 kilograms) of wire produce per hour.

In another embodiment, the present invention provides an improved speed at which formed tubes can be welded in final diameters smaller than 0.250 inch (0.635 centimeter). In one embodiment, the present invention uses a high-speed laser which can weld at speeds over 300 ft/min (91.44 meters/minute), and provides about a 30% increase in the production of small tube over conventional tube forming apparatuses.

The foregoing description of the invention has been presented for purposes of illustration and description. It is not intended to be exhaustive or to limit the invention to the precise form disclosed, and other modifications and variations may be possible in light of the above teachings. The above embodiments disclosed were chosen and described to explain the principles of the invention and its practical application to thereby enable others skilled in the art to best utilize the invention. It is intended that the appended claims be construed to include other alternative embodiments of the invention except insofar as limited by the prior art.

The invention claimed is:

1. A method for making continuously a cored wire filled with at least one fill material to a desired core ratio comprising:
   feeding a flat metal strip at a first speed during a run;
   measuring automatically dimensions of the strip continuously during the run;
   forming the strip into a channel open upwardly and sized to hold a quantity of the at least one fill material as the strip is fed during the run;
   transporting the at least one fill material continuously during the run, wherein the at least one fill material is delivered through a metering device at a delivery speed;
   determining automatically volume of a quantity of the at least one fill material in transport by the metering device;
   depositing the at least one fill material from the metering device into the channel continuously during the run at the delivery speed; and
   adjusting automatically the delivery speed during the run to ensure that the quantity of the at least one fill material deposited into the channel is in a desired core ratio range about the desired core ratio, the delivery speed adjustment being based on the first speed, the measured dimensions of the strip, and the volume of the at least one fill material determined to be in transport by the metering device.

2. The method of claim 1 wherein said transporting is via a belt conveyor of the metering device.

3. The method of claim 1 wherein said transporting is via a screw of the metering device.

4. The method of claim 1 wherein said transporting is via a belt conveyor of the metering device, and the volume of the fill material is a portion of the fill material in transport on the belt conveyor.

5. The method of claim 1 further comprises determining weight of a segment of the strip using the measured dimensions of the strip and a weight per unit of area of the strip; determining a total weight of the segment of the strip and the at least one fill material; and determining weight of the at least one fill material needed to be delivered by the metering device to the segment of strip when formed as the channel by multiplying the total weight of the segment of the strip by the desired core ratio.

6. The method of claim 5 further comprises determining a weight of the at least one fill material per unit of time needed for the segment of the strip by multiplying the first speed by the weight of the at least one fill material needed to be delivered by the metering device.

7. The method of claim 6 wherein said transporting is via a belt conveyor of the metering device, and the volume of the at least one fill material is a portion of the at least one fill material in transport on the belt conveyor; and the method further comprises determining the quantity of the at least one fill material on the belt conveyor needed to be delivered to the segment of the strip by dividing the weight of the at least one fill material per unit of time by the resultant of a bulk density of the at least one fill material times the volume of the at least one fill material in transport on the belt conveyor.

8. The method of claim 7 further comprises determining a revolution per minute (RPM) of a drive wheel driving the belt conveyor by dividing a circumference of the drive wheel by the weight of the at least one fill material per unit of time; and multiplying a gear reduction ratio of a servomotor rotating the drive wheel to provide the second speed.

9. The method of claim 1 wherein the volume of the fill material is measured using a machine vision based measurement system having a laser.

10. The method of claim 1 further comprises forming the channel into a tube during the run to enclose the fill material therein.

11. The method of claim 1 wherein the run results in about 1500 pounds (about 680.4 kilograms) per hour of the cored wire.

12. The method of claim 1 further comprises using one set of a pair of tooling sets provided on at least one station provided in the run.

13. The method of claim 1 wherein the desired core ratio range is less than ±2% and down to about 0.5% of the desired core ratio.

14. The method of claim 1 wherein the fill material is a mixture of very fine powders in a range from about 150 mesh down to about 400 mesh.

15. The method of claim 1 wherein the first speed is above 300 feet per minute (91.44 meters/minute).

16. The method of claim 1 wherein the cored wire has a final diameter in the range of about 0.03 inch (about 0.0762 centimeter) to about 0.25 inch (about 0.635 centimeter) diameter.

17. The method of claim 1 wherein the fill material is a first fill material, and said metering device is a first metering device, and said method further comprises depositing on top of said first fill material a second fill material from a second metering device.

18. The method of claim 1 further comprises checking automatically for one of a plurality of stop conditions, wherein the stop conditions include no more of the strip to feed, actual core ratio provided is out of the desired core ratio range, the measured dimensions of the strip are out of predetermined tolerances, a supply the fill material is exhausted, wire breakage, and wire jam, and if one of the stop conditions exists, then said method further comprises stopping the run.

19. The method of claim 1 further comprises forming the channel into a tube during the run to enclose the fill material therein; reducing the tube to a final diameter to produce the cored wire, and heat treating the cored wire, wherein the heat treating includes exposing the cored wire to heat up to about 400° Fahrenheit (204.44 degrees Celsius), exposing the cored wire to a controlled environment having an above atmospheric pressure of a heated super-dry mixture up to about 625° Fahrenheit (about 329.44 degrees Celsius) comprising air and a inert gas, wherein the inert dry gas is 30-40% of the heated mixture, and the air has a moisture content below 25%, cooling down the controlled environment with the cored wire remaining therein, and removing the cored wire when the controlled environment reaches about 125° Fahrenheit (51.67 degrees Celsius).

20. The method of claim 1 further comprises using a controller to determine the speed adjustment and to adjust automatically the second speed during the run.

21. The method of claim 20 further comprises entering a product number into a controller, wherein the controller reads parameters from a configuration file corresponding to the product number to specify the fill material, the core ratio, the desired core ratio range, the first speed, and size and bulk density of the flat metal strip.

22. The method of claim 21 further comprises updating automatically the configuration file with detected parameters to refine the parameters originally provided in the configuration file which can be used for a next run of the product number.

23. The method of claim 1, wherein the at least one fill material comprises a powdery fill material.

24. The method of claim 1, wherein the at least one fill material comprises both a powdery and granular fill material.

* * * * *

UNITED STATES PATENT AND TRADEMARK OFFICE
CERTIFICATE OF CORRECTION

PATENT NO. : 8,656,587 B2  Page 1 of 1
APPLICATION NO. : 12/307013
DATED : February 25, 2014
INVENTOR(S) : Karnes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1313 days.

Signed and Sealed this
Twenty-ninth Day of September, 2015

Michelle K. Lee
*Director of the United States Patent and Trademark Office*